United States Patent [19]
Shlenker et al.

[11] Patent Number: 5,267,264
[45] Date of Patent: Nov. 30, 1993

[54] SYNCHRONIZATION AND MATCHING METHOD FOR A BINARY BASEBAND TRANSMISSION SYSTEM

[75] Inventors: Erhard Shlenker; Gunter Spahlinger, both of Stutttgart, Fed. Rep. of Germany

[73] Assignee: LITEF GmbH, Freiburg im Breisgau, Fed. Rep. of Germany

[21] Appl. No.: 827,763

[22] Filed: Jan. 29, 1992

[30] Foreign Application Priority Data

Mar. 18, 1991 [DE] Fed. Rep. of Germany ....... 4108806

[51] Int. Cl.$^5$ .............................................. H03H 7/30
[52] U.S. Cl. ......................................... 375/13; 375/96
[58] Field of Search .............................. 375/12, 13, 96; 364/724.2; 333/18, 28 R

[56] References Cited

U.S. PATENT DOCUMENTS 4,674,103  6/1987  Chevillat et al. ...................... 375/13
5,031,193  7/1991  Atkinson et al. ...................... 375/13

Primary Examiner—Curtis Kuntz
Assistant Examiner—Tesfaldet Bocure
Attorney, Agent, or Firm—Elliott N. Kramsky

[57] ABSTRACT

A method for achieving an initial synchronization and matching a receive filter of a digital receiver of a binary baseband transmission system by employing a training sequence before the transmission of useful data. The coefficients of the digital filter that is to be matched to the received signal are obtained by means of the training sequence. Character synchronization and recognition of the end of the sequence occur automatically. After the training sequence is received, an optimally matched receive filter in the receiver is made available. The method is independent of the level of the received signal within a predetermined computing accuracy and can be implemented by means of a conventional signal processor system.

4 Claims, 7 Drawing Sheets

WAVEFORM
IN DELAY CHAIN 1

WAVEFORM
IN DELAY CHAIN 2

WAVEFORM
IN DELAY CHAIN 3

SYNCHRONIZATION AND MATCHING METHOD FOR A BINARY BASEBAND TRANSMISSION SYSTEM

BACKGROUND

1. Field of the Invention

The present invention relates to binary baseband transmission systems. More particularly, this invention pertains to a method for establishing initial synchronization with a training sequence (preamble) prior to transmission of useful data and for matching a receive filter of a digital receiver in a binary baseband transmission system.

2. Description of the Prior Art

Figure 1:
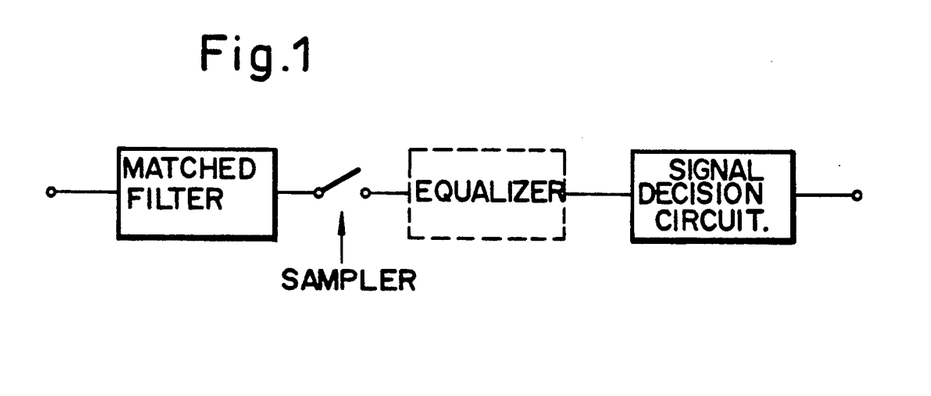
FIG. 1 is a block diagram of a matched-filter receiver.

The use of signal-matched filters in a receiver is well known in digital data transmission. Such so-called matched-filter receivers, a simplified example of which is illustrated in the block diagram of FIG. 1, include a receive filter that is matched to the received signal as receive filter. The signal is sampled at the character clock rate at the filter's output. The samples are employed by a signal decision circuit to perform the signal decision, possibly following an additional equalization. The use of a matched filter as a receive filter maximizes the signal/noise ratio at the input of the signal decision circuit with correctly timed sampling and with superposed white noise.

In the event that the signal possesses pulse interferences at the output of the matched filter, a signal decision circuit which incorporates the intersymbol interferences into the decision can be used for implementing an optimum receiver. See, for example, G. D. Forney, Jr., "Maximum-Likelihood Sequence Estimation of Digital Sequences in the Presence of Intersymbol Interference," *IEEE Transactions on Information Theory*, Vol. IT-18, (May 1972) pages 363-378, and J. Huber, "Detektoren und Optimalfilter fur Digital-signals mit Impulsinterferenzen (Detectors and Optimal Filters For Digital Signals With Interpulse Interference)", *Frequenz* 41 (1987), pages 161-167 and 189-196.

Since the signal decision circuits are technically highly complex, a sub-optimum combination of equalizer and threshold-value decision circuit is employed, as a rule, when pulse interferences occur. Signal equalization reduces the signal/noise ratio at the input of the threshold-value decision circuit, leading to a loss in optimum performance.

If the transmission channel is unknown and/or variable with time, the receive filter and the signal decision circuit or the equalizer must be matched to the received signal.

An optimum receiver in which the receive filter is matched to the received signal by minimizing the noise component of the samples at the output of the receive filter has been proposed. See G. Ungerboeck, "Adaptive Maximum-Likelihood Receiver for Carrier-Modulated Data-Transmission System," *IEEE Transactions on Communications*, Vol. COM-22, (May 1974) pages 624-636. Sussman and Monsen have proposed a receiver in which a constructive adding together of the received pulses is achieved by feeding back the delayed received signal. S. M. Sussman, "A Matched Filter Communication System for Multipath Channels," *IRE Transactions on Information Theory*, Vol. IT-6, (June 1960) pages 367-373 and P. Monsen, "Fading Channel Communications," *IEEE Communications Magazine* (January 1980), pages 16-25. A matched filter can then be implemented by correlating the received pulse thus determined with the received signal.

Figure 2:
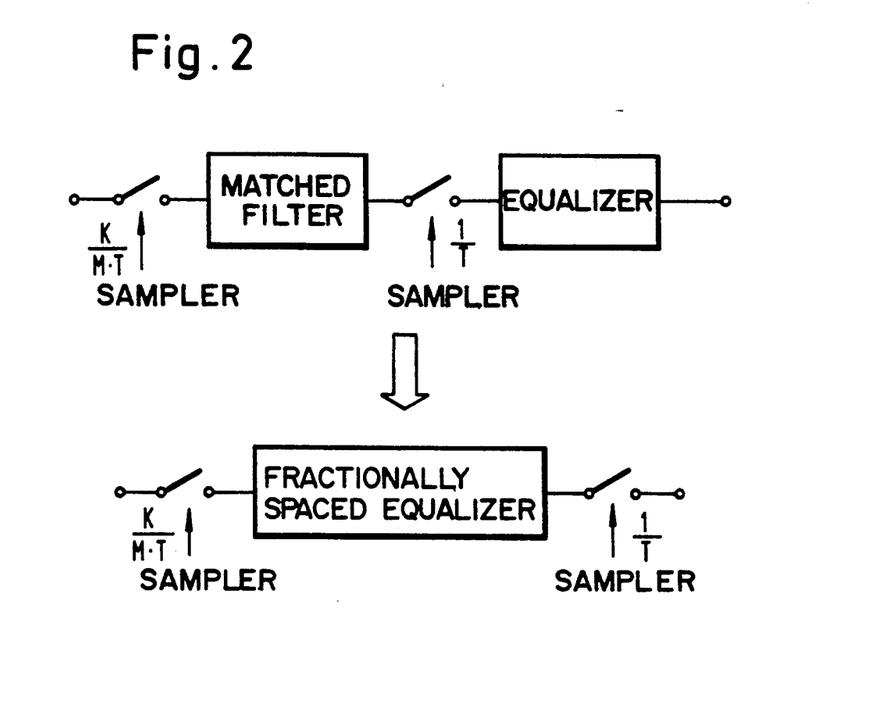
FIG. 2 is a block diagram of a matched filter in combination with a T-spaced equalizer to a fractionally-spaced equalizer (FSE)

Receivers with adaptive equalizers are either implemented with fixed receive filters and "T-spaced equalizer" or as "fractionally spaced equalizer" (FSE). Receivers with fixed receive filter and adaptive T-spaced equalizer are sensitive to sampling clock deviations from the ideal sampling time. An FSE represents the synthesis of a digitally implemented matched filter with a conventional T-spaced equalizer (compare FIG. 2). The FSE is advantageously insensitive to deviations of signal element timing from the ideal sampling time. Compare G. Ungerboeck, "Fractional Tap-Spacing Equalizer and Consequences for Clock Recovery in Data Modems," *IEEE Transactions on Communications*, Vol. COM-24, No. 8, (August 1976). A summary of the capabilities of adaptive equalizers is provided by S.U.H. Quereshi, "Adaptive Equalization," *Proceedings of the IEEE*, Vol. 73, No. 9 (September 1985).

The operation of a matched-filter receiver requires correct timing of the sampling of the signal at the output of the matched filter. To insure this, the correct sampling time must be obtained from the received signal. Two operating states can be distinguished in character synchronization. These are, firstly, the state at the beginning of a data transmission in which there is no synchronization and, secondly, the state after synchronization has been achieved and only small fluctuations must be compensated. Without synchronization, no useful data can be received since the error rate of the decision circuit is too high. For this reason, the character synchronization is generally adjusted during the reception of a previously mentioned training sequence. Any equalizer which may be present can only be adjusted after character synchronization has been achieved which, in turn, is accomplished with the aid of a training sequence. See *CCITT Recommendation*, V. 27bis and V.27ter. The exception is the FSE in which the character synchronization occurs automatically during equalizer adjustment.

SUMMARY AND OBJECTS OF THE INVENTION

It is an object of the present invention to achieve a method for establishing the initial synchronization and for demodulating signals which have been produced by linear superposition of equidistant pulses of arbitrary but fixed shape and with signs dependent on modulated binary data that relies upon a short training sequence of simple structure.

It is another object of this invention to provide a method that achieves the above object while requiring only a comparatively simple signal processor of commercially available construction.

The foregoing and other objects of this invention are achieved by the present invention that provides a method for establishing initial synchronization by means of a training sequence prior to transmission of useful data and for matching the receive filter of a digital receiver of a binary baseband transmission system. Such method is begun by establishing a data block as the training sequence, such data block having a length of k bits and containing a predetermined number of m bit patterns where $m \geq 2$. The periods of the bit patterns are of differing lengths $n_i$ and in each case each bit pattern contains complementary information after one period length of $n_i$ bits (i=1 to m).

The received signal is then sampled in the receiver at an integral multiple L of a signal element timing frequency, such multiple being at least equal to the minimum Nyquist sampling frequency. The sampled signal is applied to the inputs of m parallel-connected filters, each including (i) a delay chain of length $n_i \times L$ and (ii) an additive feedback with negative sign in which the ratios of the m different feedback coefficients $a_i$ are selected so that the amplitudes of the waveforms at the end of the training sequence are of equal magnitude.

The phase angles of the bit patterns are selected with respect to one another so that the waveforms the filters coincide at a preselected time $N_{min}$ prior to the end of the training sequence. Thereafter, the coincidence is recognized by correlating the waveforms in the filters.

It is advantageous in the correlation for recognizing coincidence to employ the quotient of the product of the crosscorrective of the waveforms and of the product of the dissimilarity factors as a measure of the coincidence between two waveforms. The dissimilarity factors are formed of the sum of the autocorrelative of the waveforms, formed in each case over the entire length of a delay chain and reduced by twice the crosscorrelative.

The correlations are suitably determined recursively. A new correlation value is calculated in each case by subtracting the product of two values shifted out of the delay chain with the signal element product of two values timing from the old correlation value while adding the product of two values newly shifted into the delay chains to the old correlation value.

The value m=3 has proven a satisfactory number of periodic bit patterns and parallel filters for a practical system for establishing initial synchronization by means of the invention.

In light of cost considerations, a matched-filter receiver in which the digital receive filter was matched to the received signal during the reception of a training sequence was built for testing the invention. This receive filter was subsequently employed for demodulation of the data sequence. The method of Sussman, ibid, wherein a matched filter is created by constructive adding together of the pulses contained in the received signal, is not in accord with the abovementioned requirements of the method of the invention as it can only be applied when it is not necessary to assume intersymbol interferences in the received signal. In contract, the inventive method for initial synchronization makes it possible to determine the coefficients of a digital filter matched to the received signal during reception of a special training sequence even when intersymbol interferences are occurring.

The invention is mainly distinguished by the following:

The training sequence has a simple structure, reducing the control complexity for setting up the connection in the transmitter.

The method automatically identifies the reception and the end of a training sequence.

During identification, data are built up in the receiver that are employed for matching the receive filter to the characteristics of the received signal.

The method simultaneously provides optimum character synchronization permitting omission of an additional training sequence for character synchronization.

The functional capability of the method is independent of the level of the received signal within limits given by computing accuracy.

The method can also be used for received signals having a small signal/noise ratio in the range of 0 dB.

During synchronization, a continuous correlation process runs in the receiver that is adapted to the training sequence specially constructed for this purpose and is optimized in such a manner that only a small number of arithmetic operations is needed per unit of time.

The foregoing and additional features and advantages of this invention will become further apparent from the detailed description that follows. Such description is accompanied by a set of drawing figures. Numerals of the drawing figures, corresponding to those of the written text, point to the features of the invention, like numerals referring to like features throughout both the drawing figures and the written text.

DETAILED DESCRIPTION

The invention is concerned with the transmission of binary digital data via an analog channel with fixed (but unknown) attenuation and unknown phase distortions. The data stream consists of a sequence of symbols from the {"0", "1"} set modulated so that each symbol or bit of the data stream sends out a pulse of a given, fixed form, the symbols "0" and "1" also providing the pulse with an additional weighting of −1 and +1 respectively. Pulses are sent in a fixed time pattern and can be mutually superposed. The totality of the data to be transmitted forms a message that is preceded by a preamble consisting of a predetermined bit sequence (designated and described in greater detail below as the training sequence.) The receiver uses the preamble as a mark of the beginning of a message.

The method of the invention, for initial synchronization with subsequent demodulation is based on the following requirements:

the receiver must be matched to the transmission channel;

a short, simple training sequence is desired;

reliable recognition of the beginning of a data sequence to be transmitted (equivalent to the recognition of the end of the training sequence) must be guaranteed;

functional capability must be guaranteed even in the event of a received signal of low signal/noise ratio; and the modem employed should be implemented by means of an existing commercially available signal processor (i.e. the number of possible arithmetic operations per unit of time is limited.)

A "maximum-likelihood receiver", as proposed by Ungerboeck, ibid, is unsatisfactory, particularly in view of the last-mentioned reason.

The inventors' approach is based upon a receiver structure with fixed receive filter, sampler and T-spaced equalizer that presupposes the use of training sequences for establishing character synchronization and for adjusting the equalizer. Corresponding algorithms for character synchronization and for adjusting the equalizer coefficients are implemented in the receiver. In addition, an algorithm for recognizing the training sequences and the beginning of the data sequence is implemented.

The inventors have found that the necessary training sequence can be simplified if a receiver with FSE is employed since, in such case, separate character synchronization is no longer required. However, the problem of recognition of the end of the training sequence will still exist. In addition, the expense of implementing an adaptive equalizer is generally excessive.

The method of the invention is described below and with reference to the drawing figures for use in a digital receiver of a binary baseband transmission system. During reception of a special training sequence, the invention makes it possible to determine the coefficients of a digital filter matched to the received signal. Furthermore, character synchronization is carried out and the end of the training sequence is automatically recognized. After reception of a training sequence, a receive filter matched to the signal is provided in the receiver and optimum character synchronization is assured. As mentioned, the method of the invention is independent of the level of the received signal within practical limits dictated by the computing accuracy.

Figure 3:
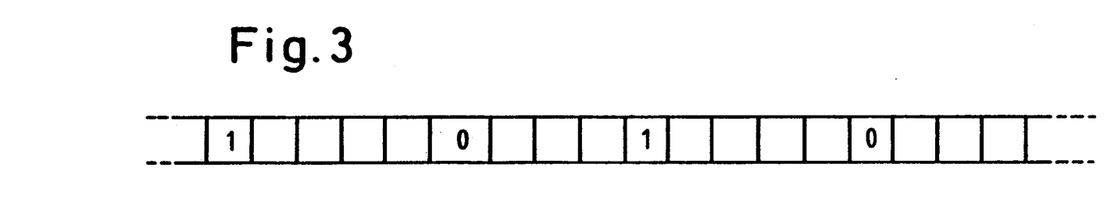
FIG. 3 illustrates the structure of a data block for use as a training sequence.

The training sequence required is generated by the transmitter by transmitting a special data block A. This is done immediately prior to transmission of the useful data. The data block A employed for the training sequence is structured to contain a particular number m of periodic bit patterns having different period lengths $n_i$. (A periodic bit pattern of period n is characterized by the fact that, starting from a particular bit of data block A, each nth bit is complementary. Note FIG. 3.)

In the receiver, the received signal is sampled with an integral multiple L of the signal element timing frequency. The sampling frequency is selected to adhere to the Nyquist sampling criterion. During the synchronization phase or the setting up of the connection, the sampled signal is then applied in parallel to the inputs of m recursive filters, illustrated for m=3 in FIG. 4. In each case such filters consist of a delay chain of length $n_i L$ stages corresponding to a time delay in each case of $n_i$ symbols. As shown, the feedback is of negative sign.

Figure 4:
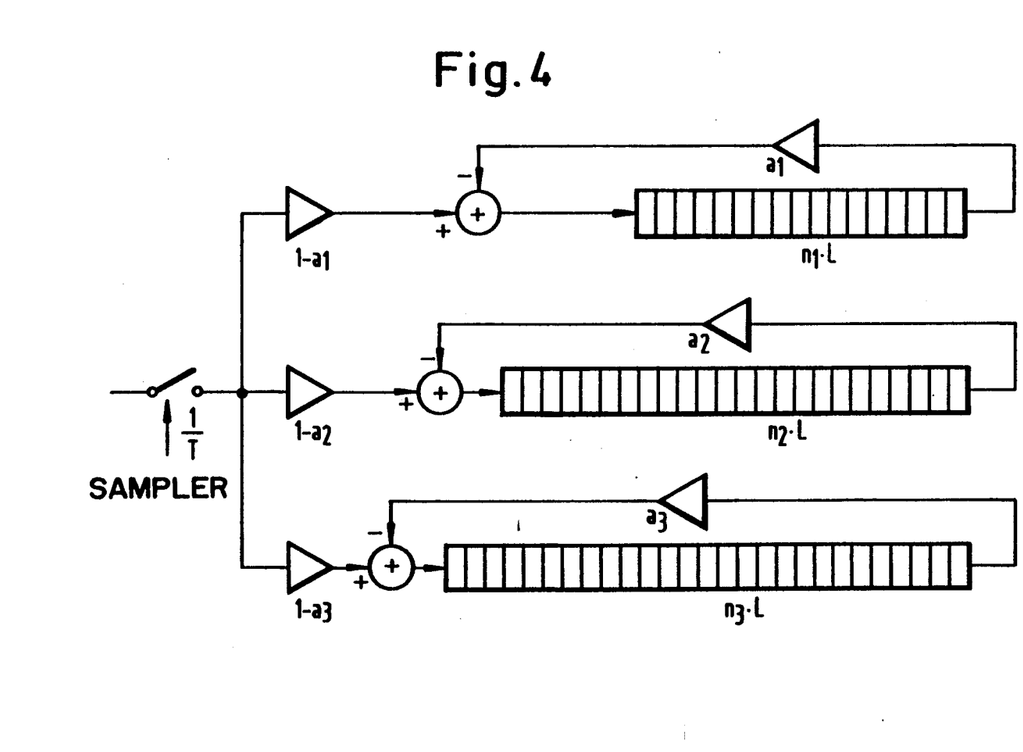
FIG. 4 is a circuit diagram of a recursive filter in accordance with an embodiment of the invention.

When a training sequence is received, the pulses of a periodic bit pattern, distorted by the transmission channel, are constructively added together in the respective filter as the remaining pulses and noise superposed on the received signal are statistically superposed. Assuming that the received pulse distorted by the channel contains significant energy components only for the duration of n symbols where n is smaller than the minimum of the period lengths $n_{min}$, rotating waveforms of the received pulse form exist in the m delay chains. the filter coefficients are dimensioned so that the amplitudes of the waveforms are of the same magnitude after reception of the training sequence. The training sequence is dimensioned so that pulses not belonging to a bit pattern are suppressed as well as possible by the associated filter.

Figure 5:
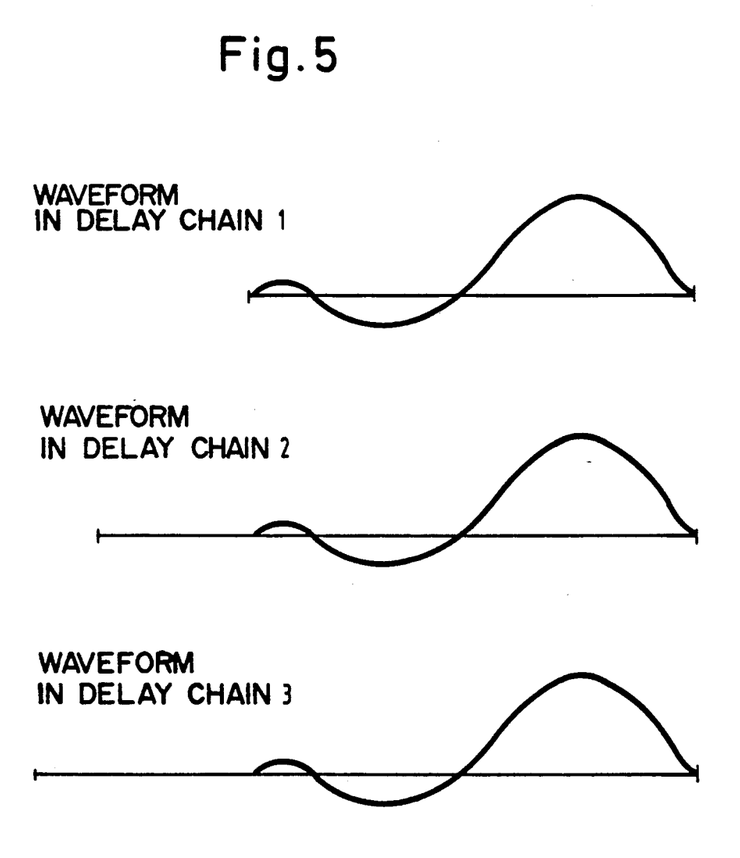
FIG. 5 is a series of waveforms for illustrating the operation of the delay chains of a recursive filter in accordance with FIG. 4 for the case of a coincidence of the rotating waveforms prior to the end of a training sequence.

The phase angles between the individual bit patterns of the training sequence are selected with respect to one another so that coincidence is obtained among the rotating waveforms in the delay chains exactly $n_{min}$ symbol elements before the end of the training sequence (Note FIG. 5). This time can be unambiguously recognized if the number of symbols of the training sequence is less than the smallest common multiple of the period lengths $n_i$ of the periodic bit patterns.

The coincidence is recognized by means of a correlation method. The product of all crosscorrelatives divided by the product of all dissimilarity factors (defined below) is taken as a measure of coincidence. The crosscorrelation is in each case carried out over the last $n_{min}$ symbols of two delay chains.

The dissimilarity factor between two delay chains is obtained from the sum of two autocorrelatives formed, in each case, over the entire length of the delay chain, reduced by twice the crosscorrelative. These steps determine a measure of the coincidence which is independent of the input signal level.

Figure 6:
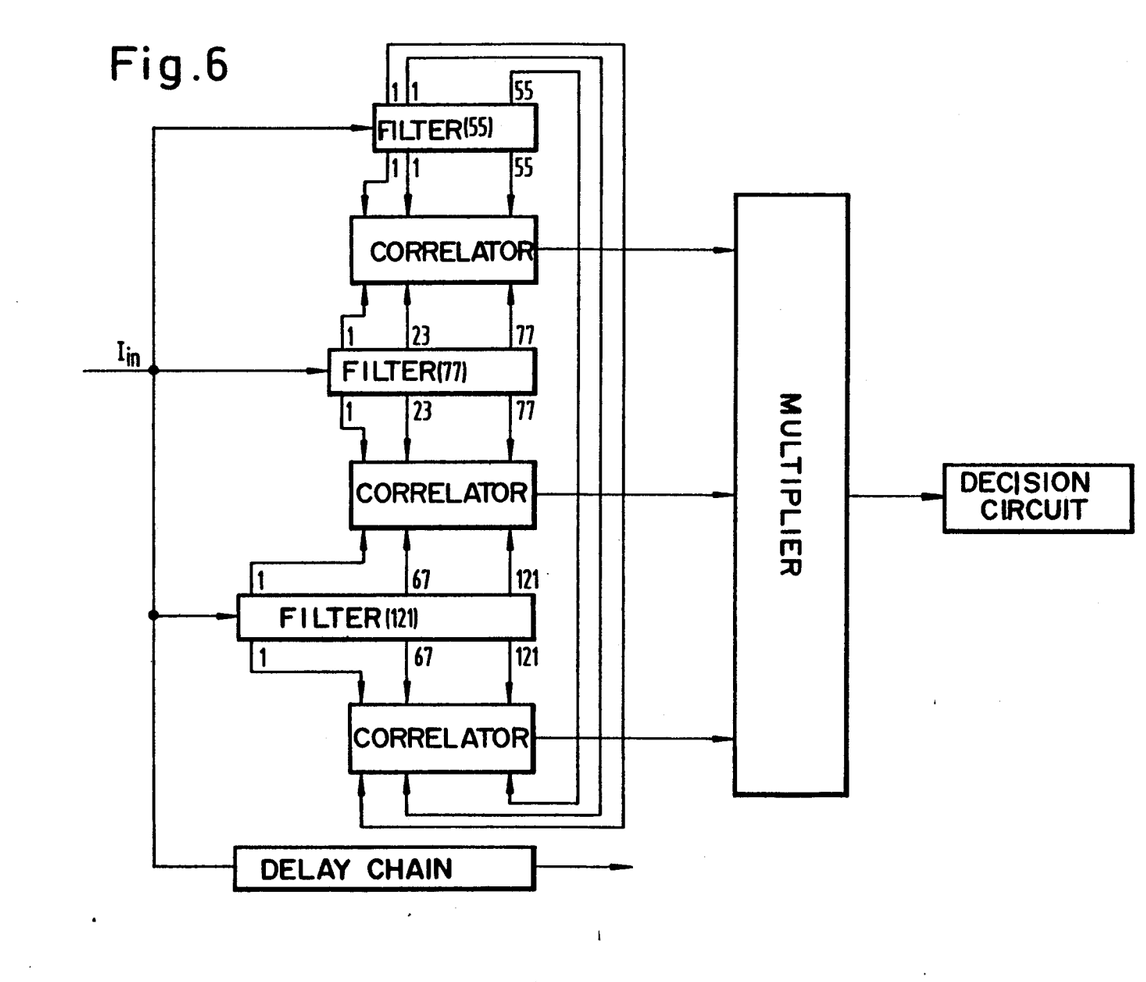
FIG. 6 is a block diagram of a triad arrangement of recursive filters as in FIG. 4 employing three recursive filters, three correlators and a delay chain without feedback.
Figure 7:
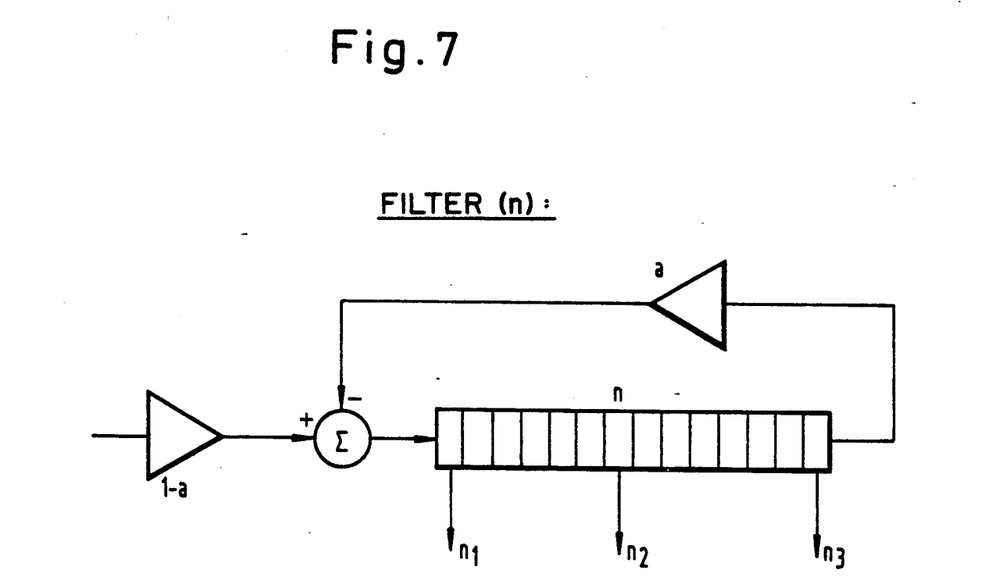
FIG. 7 is a circuit diagram of a recursive filter having a delay chain of length n, a feedback factor a and taps at pints $n_1$, $n_2$ and $n_3$ of the delay chain.

The individual crosscorrelations are determined in accordance with a simplified method. Since the values circulating in the delay chains (note FIGS. 4 and 6) are shifted parallel to one another within the correlation window, the correlation can be calculated recursively. That is, the product of the two values shifted out of the correlation window is subtracted from the old correlation value while the product of the two values newly shifted in is added. Thus, only two additions and two multiplications are required for calculating a correlation.

Coincidence is recognized when the measure of the correlation of the delay chain contents, after exceeding a threshold, reaches a maximum that is not exceeded for the subsequent $n_{min}$ symbols. After $n_{min}$ symbols have been run through, the end of the training sequence has been reached. The waveforms of the received pulse are now aligned with one another at the input of the delay chain. The values located in the delay chains are then loaded as coefficients for a digital receive filter which is thus matched to the received signal. Since the set of coefficients of the filter now has correct phase with respect to the received signal, optimum character synchronization is assured.

A circuit for accomplishing the synchronization phase in accordance with the invention is illustrated in FIGS. 6 through 9. The input signal is sampled at eleven (11) times the bit repetition frequency. The sampled signal $I_{in}$ is then applied in parallel to the inputs of three recursive filters and one delay chain with feedback (refer to FIG. 6), the latter having no function in the synchronization phase. Filters consist of delay chains having lengths of 55, 77 and 121 stages respectively, corresponding to delay times of 5, 7 and 11 symbols. The feedback is of negative sign. The input is supplied with the pulse sequence of the training sequence (preamble, a sequence of 384 bits) distorted by the channel. The sequence contains three periodic bit patterns with periods of 10, 14 and 22 bit lengths which are complementary to themselves with one half period shifts.

One half period of the patterns of the abovementioned period lengths, hidden in the preamble, forms in each of the filters. Assuming that the elementary pulse distorted by the channel only contains significant energy components for the duration of five symbols, rotating waveforms of the distorted elementary pulse form in the three delay chains of the recursive filter. The three filters are dimensioned in such a manner that, after the preamble has been completed, the amplitudes of the three waveforms are of equal magnitude (Note FIG. 5). The phase angles of the individual bit patterns of the preamble are selected with respect to one another so that coincidence is obtained among the three rotating waveforms in the delay chains exactly five symbol elements before the end of the preamble.

Figures 8, 9:
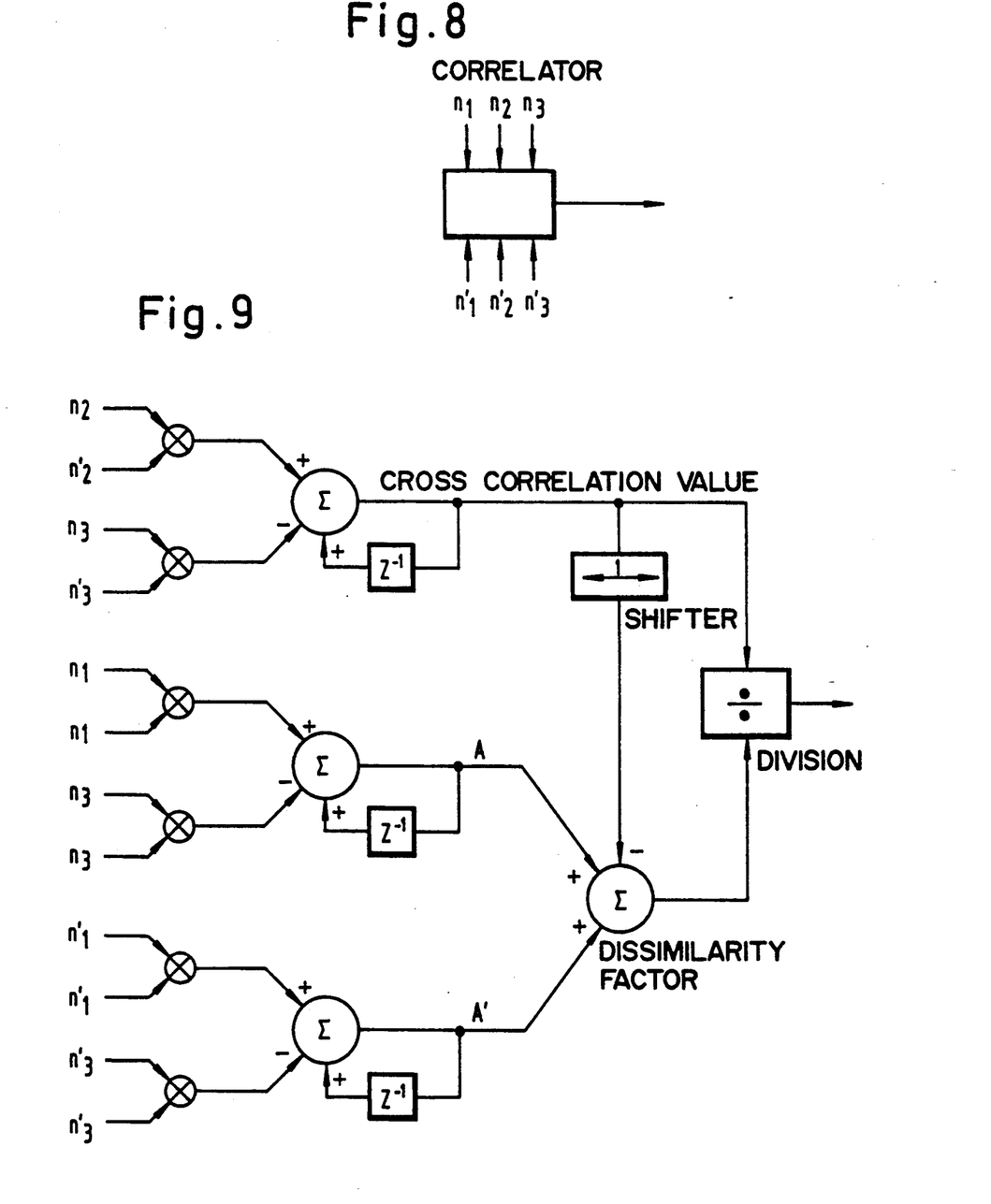
FIG. 8 is a diagrammatic representation of a correlator.
FIG. 9 is a flow-diagram of the recursive cross-correlation process.

The coincidence is recognized by a correlation process (refer to FIG. 9). The product of the three possible crosscorrelatives divided by the product of the three possible dissimilarity factors, defined below, is a measure of the coincidence. The dissimilarity factor between the waveforms of two delay chains is obtained from the sum of the two auto-correlatives reduced by twice the crosscorrelative. The correlations are formed in a simplified method. As the values circulating in the delay chains are shifted through parallel to one another within a correlation window, the correlation can be recursively calculated. That of the two values newly shifted in is added. The coincidence is recognized when the measure defined above, after exceeding a predetermined threshold, reaches a maximum that is not exceed again after five further symbols. After the five subsequent symbols have passed through, the end of the preamble (training sequence) is reached. The waveforms of the distorted pulses are now located left-justified in the three chains of FIG. 6.

Figure 10:
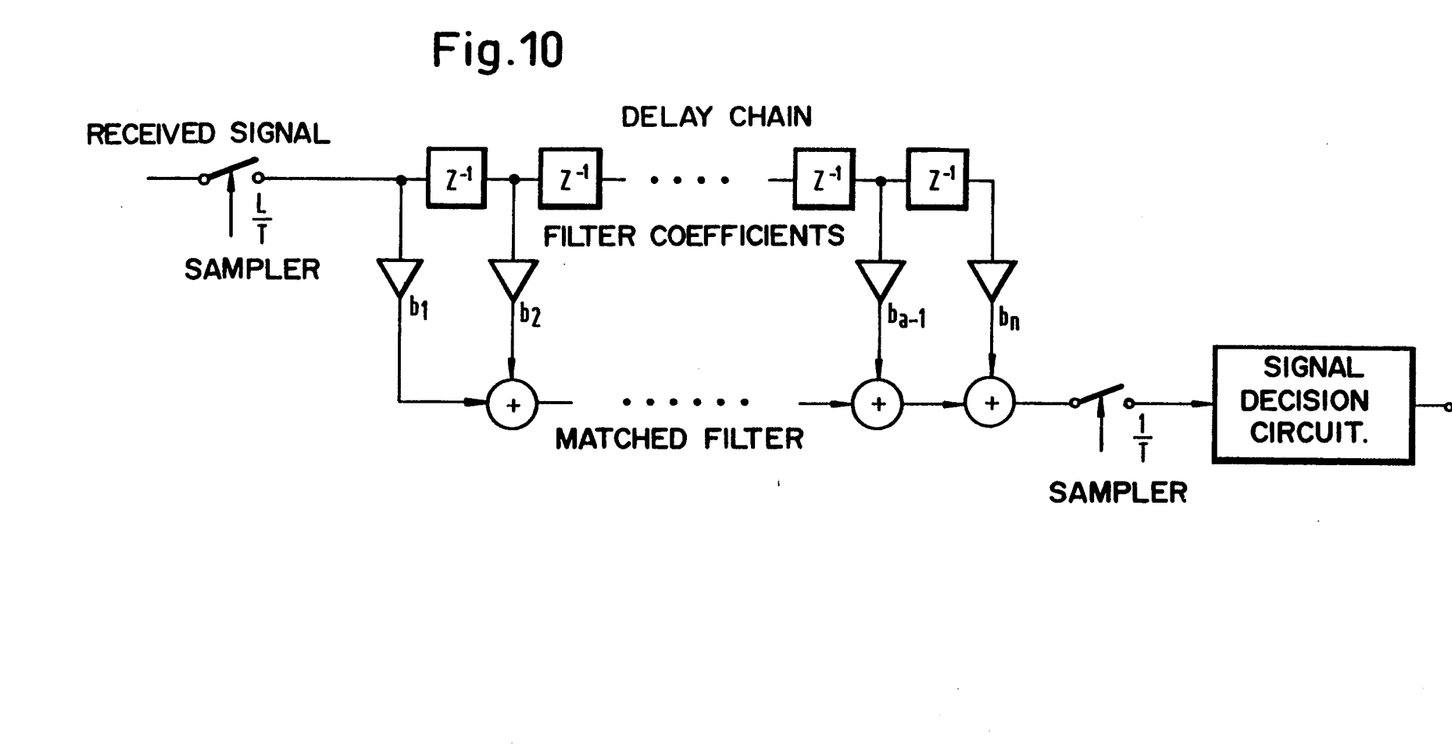
FIG. 10 illustrates the demodulation process in accordance with the invention.

The structure of the system in the demodulation phase is illustrated in FIG. 10. The wave form of the distorted elementary pulse located in the delay chain of length 77 is employed as a set of coefficients for a transversal filter whose input values are shifted through the delay chain without feedback (Note FIG. 6). After conclusion of the synchronization phase, the last symbol of the preamble (training sequence) has the correct phase with respect to the set of coefficients so that the next symbol is the first useful symbol of the message.

The characteristics of a system according to the invention can be summarized as follows:

a) The system can assume the two states of synchronization phase and demodulation phase. During the synchronization phase, the system identifies a preamble (training sequence) of a message. As soon as the preamble has been detected, the system changes into the demodulation phase in which the content of the message is demodulated.

b) In the synchronization phase, a continuous correlation process runs that is adapted to the preamble or training sequence specially constructed for this purpose and is optimized in such a manner that only a small number of arithmetic operations is required per unit of time.

c) The system identifies the preamble or training sequence independently of the signal level within limits established by the computing accuracy.

d) Interference and noise during the transmission of the preamble do not impair successful progress of the identification (within certain limits).

e) During the identification process, data are built up in the system and used for matching the system to the transmission channel in the subsequent demodulation process so that, in each case, a special training sequence can be omitted.

f) At the end of the synchronization phase, the timing pattern for the signal decision circuit (i.e., the symbol synchronization) is automatically established.

g) During the demodulation phase, phase distortions of the channel can be compensated by an optimal filter. At the same time, an advantageous signal power to noise power ratio is achieved. (The coefficients of the optimal filter were built up during the synchronization phase.)

Thus it is seen that the present invention provides a method for establishing the initial synchronization and for demodulating signals produced by linear superposition of equidistant pulses of arbitrary but fixed shape and with signs dependent on modulated binary data that relies upon a short training sequence of simple structure. Furthermore it can be seen that this object is achieved in a system that requires only a comparatively simple signal processor of commercially available construction.

While this invention has been described with reference to its presently-preferred embodiment, it is not limited thereto. Rather, this invention is limited only insofar as defined by the following set of patent claims and includes all equivalents thereof within its scope.

What is claimed is:

1. A method for establishing initial synchronization in binary baseband transmission system by sending a training sequence prior to sending useful data by the transmitter, and after reception of the transmitted signal by the receiver, by matching the receiver filter of the digital receiver to the transmission channel, comprising the steps of:

a) establishing a data block as said training sequence, said data block having a length of k bits and containing a predetermined number of m bit patterns with $m \geq 2$, the periods of said bit patterns being of differing lengths $n_i$, and each of said bit patterns in each case containing complementary information after one period length of $n_i$ bits with $i = 1$ to m; then b) sampling the received signal in the receiver at an integral multiple L of a signal element timing frequency, said integral multiple being at least equal to the minimum Nyquist sampling frequency; then c) applying said sampled signal to the inputs of m parallel-connected filters, each of said filters including (i) a delay chain of length $n_i \times L$, and (ii) an additive feedback with negative sign in which the ratios of m different feedback coefficients $a_i$ are selected so that the amplitudes of the waveforms at the end of the training sequence are of equal magnitude; then d) selecting phase angles of said bit patterns with respect to one another so that the waveforms in said filters coincide at a pre-selected time $n_{min}$ prior to the end of said training sequence; and then
e) recognizing said coincidence by correlating said waveforms in said filters.

2. A method as defined in claim 1, wherein the step of recognizing said coincidence is further characterized by the steps of:
a) forming the cross correlations and the dissimilarity factors of said waveforms; then
b) dividing the product of the cross correlatives of said waveforms by the product of the dissimilarity factors to obtain a measure of coincidence between the m waveforms; and
c) said dissimilarity factors are formed from the sum of the auto correlative of the waveforms, formed in each case over the entire length of the delay chain, reduced by twice the cross correlative then
d) comparing said measures of coincidence against a predefined threshold to detect the end of the training sequence; and then
e) determining the coefficients of a matched receiving filter by using the waveforms in said in parallel-connected filters.

3. A method as defined in claim 2 further characterized in that said correlations are determined recursively, a new correlation value in each case being calculated by subtracting the product of two values shifted out of said delay chain with the signal element timing from the old correlation value while adding the product of two values newly shifted into the delay chains to the old correlation value.

4. A method as defined in claim 3 wherein the number of the periodic bit patterns and parallel filters is selected as $M=3$.

* * * * *

UNITED STATES PATENT AND TRADEMARK OFFICE
CERTIFICATE OF CORRECTION

PATENT NO. : 5,267,264
DATED : November 30, 1993
INVENTOR(S) : Erhard Schlenker and Gunter Spahlinger It is certified that error appears in the above-identified patent and that said Letters Patent is hereby corrected as shown below:

On the title page, item (19):
delete "Shlenker et al." and insert therefor --Schlenker et al.--

On the title page, item (75): Inventors:
delete "Erhard Shlenker" and insert therefor --Erhard Schlenker--

Signed and Sealed this

Thirtieth Day of August, 1994

Attest:

BRUCE LEHMAN

Attesting Officer

Commissioner of Patents and Trademarks